United States Patent
Kim et al.

(10) Patent No.: US 9,801,097 B2
(45) Date of Patent: Oct. 24, 2017

(54) NETWORK EMPLOYING SPACE RECYCLING, AND A METHOD FOR MANAGING THE NETWORK

(71) Applicant: ELECTRONICS AND TELECOMMUNICATIONS RESEARCH INSTITUTE, Daejeon (KR)

(72) Inventors: Kyeongpyo Kim, Daejeon (KR); Seung Eun Hong, Daejeon (KR); Woo Yong Lee, Daejeon (KR); Hyun Kyu Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/925,208

(22) Filed: Oct. 28, 2015

(65) Prior Publication Data

US 2016/0066216 A1    Mar. 3, 2016

Related U.S. Application Data

(63) Continuation of application No. 13/384,594, filed as application No. PCT/KR2010/004670 on Jul. 16, 2010, now Pat. No. 9,179,467.

(30) Foreign Application Priority Data

Jul. 17, 2009   (KR) .................. 10-2009-0065347
Nov. 30, 2009   (KR) .................. 10-2009-0116691

(51) Int. Cl.
*H04W 28/26*   (2009.01)
*H04W 16/28*   (2009.01)
(Continued)

(52) U.S. Cl.
CPC .......... *H04W 28/26* (2013.01); *H04W 16/28* (2013.01); *H04W 72/082* (2013.01); *H04W 72/1231* (2013.01)

(58) Field of Classification Search
None
See application file for complete search history.

(56) References Cited

U.S. PATENT DOCUMENTS

| | | | |
|---|---|---|---|
| 2004/0028018 A1* | 2/2004 | Cain | H04B 7/2643 370/338 |
| 2007/0105559 A1* | 5/2007 | Dillon | H04W 72/10 455/443 |

(Continued)

FOREIGN PATENT DOCUMENTS

| | | |
|---|---|---|
| EP | 2037706 A2 | 3/2009 |
| KR | 2007-0055630 A | 5/2007 |

(Continued)

OTHER PUBLICATIONS

Zhou Lan et al., "On-Demand Device Discovery Enhancement of IEEE802.15.3 MAC for 60Ghz WPAN System", Published in: Personal, Indoor and Mobile Radio Communications, 2008. PIMRC 2008. IEEE 19th International Symposium on Sep. 15-18, 2008.

*Primary Examiner* — Ayaz Sheikh
*Assistant Examiner* — Sori Aga
(74) *Attorney, Agent, or Firm* — Rabin & Berdo, P.C.

(57) ABSTRACT

A method of allocating time for a communication device includes receiving a request for allocation of a second time period related to a second communication link, after allocating a first time period related to a first communication link, and reserving the portion of the second period overlapping the first period, wherein the first link is generated between first and second communication devices, and the second link is generated between third and fourth communication devices. A further aspect of the method includes (Continued)

identifying the first period reserved in advance, and receiving the request for allocating the second period, and allocating the second period to spatially overlap the first time period. A further aspect of the method includes identifying an existing reservation for the first period of the first link, receiving a new reservation for the second period, and allocating the second period to spatially overlap the first period.

19 Claims, 8 Drawing Sheets

(51) Int. Cl.
  *H04W 72/08* (2009.01)
  *H04W 72/12* (2009.01)
  *H04B 7/212* (2006.01)

(56) References Cited

U.S. PATENT DOCUMENTS

| | | | |
|---|---|---|---|
| 2009/0059890 A1* | 3/2009 | Cordeiro | H04W 28/20 370/348 |
| 2009/0203372 A1 | 8/2009 | Horn et al. | |
| 2009/0273520 A1 | 11/2009 | Shao et al. | |

FOREIGN PATENT DOCUMENTS

| | | |
|---|---|---|
| KR | 2008-0109802 A | 12/2008 |
| KR | 2009-0051247 A | 5/2009 |
| KR | 2009-0109285 A | 10/2009 |

* cited by examiner

US 9,801,097 B2

NETWORK EMPLOYING SPACE RECYCLING, AND A METHOD FOR MANAGING THE NETWORK

CROSS-REFERENCE TO RELATED APPLICATIONS

This is a continuation of U.S. application Ser. No. 13/384,594, filed on Jan. 17, 2012, which is, in turn, a national phase application, under 35 U.S.C. 371, of international application No. PCT/KR2010/004670, filed Jul. 16, 2010, which claimed priority to Korean Patent Application No. 10-2009-0065347 and of Korean Patent Application No. 10-2009-0116691, respectively filed on Jul. 17, 2009 and Nov. 30, 2009, in the Korean Intellectual Property Office, the disclosures of which are incorporated herein by reference.

BACKGROUND

1. Field of the Invention

Embodiments of the present invention relate to a pico network (piconet) for a Near Field Communication (NFC), and more particularly, to a technology that may increase utilization of wireless resources when communication devices in a piconet use directional antennas.

2. Description of the Related Art

Recently, studies are being actively performed on pico networks (piconets) for a Near Field Communication (NFC). A piconet employs a centralized Medium Access Control (MAC) protocol to increase efficiency of management and communication, and includes a piconet coordinator (PNC) or a network coordinator, and a plurality of communication devices. The plurality of communication devices may form at least one transmitter/receiver pair, namely, a source-destination relationship.

In the piconet, multiple communication links may be used, and the communication links may typically use different frequency resources, or different time resources. However, when different frequency resources or different time resources are used, utilization of wireless resources may be reduced.

Additionally, when each of the communication devices uses a directional antenna, a spatial reuse scheme may be used. In the spatial reuse scheme, at least two transmitter/receiver pairs use the same frequency resource and the same time resource, whereas beams of communication links for the at least two transmitter/receiver pairs are formed in spatially different directions. When the beams of the communication links are individually formed in different directions using the directional antenna, interference between the beams of the communication links may be reduced even though the communication devices use the same wireless resource, namely, the same frequency resource and the same time resource.

A time resource reserved in advance for a predetermined transmitter/receiver pair may be reserved again for another transmitter/receiver pair using the spatial reuse scheme. Such overlapping reservation may increase utilization of time resources, and accordingly, the overall throughput of the piconet may be increased. However, there is a demand to further study how to perform the overlapping reservation, and which protocol is used for the overlapping reservation.

SUMMARY

According to an aspect of the present invention, there is provided a method of operating a network coordinator for a spatial reuse scheme, the method includes receiving a reservation request for a time period for a data communication of a target transmitter/receiver pair, the target transmitter/receiver pair using a directional antenna; searching for a time period reserved in advance for another transmitter/receiver pair, from a Channel Time Allocation Period (CTAP), the CTAP being a contention-free access period for the data communication; and reserving a time period for the target transmitter/receiver pair in the CTAP, so that the time period reserved for the target transmitter/receiver pair overlaps the time period reserved in advance for the other transmitter/receiver pair.

The receiving may include receiving the reservation request for the time period for the data communication of the target transmitter/receiver pair in a Contention Access Period (CAP).

The target transmitter/receiver pair may perform the data communication in the time period reserved for the target transmitter/receiver pair, using the directional antenna based on the spatial reuse scheme.

The target transmitter/receiver pair may perform the data communication in the time period reserved for the target transmitter/receiver pair, based on a channel state of the target transmitter/receiver pair.

The searching may include searching for a time period reserved in advance for the other transmitter/receiver pair, a length of the time period reserved in advance for the other transmitter/receiver pair being equal to or greater than a length of the time period for the target transmitter/receiver pair. The reserving may include reserving the time period for the target transmitter/receiver pair, when the time period reserved in advance for the other transmitter/receiver pair is found as a result of the searching, the length of the time period reserved in advance for the other transmitter/receiver pair being equal to or greater than the length of the time period for the target transmitter/receiver pair.

The reserving may include reserving the time period for the target transmitter/receiver pair so that the time period reserved for the target transmitter/receiver pair overlaps the time period reserved in advance for the other transmitter/receiver pair, regardless of a length of a time period remaining in the CTAP.

The method may further include receiving a reservation request for a time period for an antenna training of the target transmitter/receiver pair, the antenna training being associated with the spatial reuse scheme in the CAP; and reserving the time period for the antenna training in the CTAP.

The method may further include canceling a reservation of the time period for the target transmitter/receiver pair, when an interference occurring in the other transmitter/receiver pair is equal to or higher than a predetermined level, or when a channel state of the target transmitter/receiver pair is lower than a predetermined level, the interference being caused by reserving the time period for the target transmitter/receiver pair.

The method may further include generating an indicator to indicate that the spatial reuse scheme is used in the time period for the target transmitter/receiver.

According to another aspect of the present invention, there is provided a method of operating a network coordinator for a spatial reuse scheme, the method including receiving a reservation request for a time period for a data communication of a target transmitter/receiver pair, the target transmitter/receiver pair using a directional antenna; identifying a sector among a plurality of sectors from which an area is divided in advance, the sector being related to the target transmitter/receiver pair; searching for a time period reserved in advance for another transmitter/receiver pair, from a CTAP, the CTAP being a contention-free access period for the data communication; comparing the identified sector with a sector related to the other transmitter/receiver pair; and reserving a time period for the target transmitter/receiver pair in the CTAP, based on a result of the comparing.

The reserving may include reserving the time period for the target transmitter/receiver in the CTAP so that the time period for the target transmitter/receiver overlaps the time period reserved in advance for the other transmitter/receiver pair, when the sector related to the target transmitter/receiver pair is different from the sector related to the other transmitter/receiver pair.

The target transmitter/receiver pair may perform the data communication in the time period for the target transmitter/receiver, using the directional antenna based on the spatial reuse scheme.

According to still another aspect of the present invention, there is provided a method of operating a communication device included in a target transmitter/receiver pair that uses a directional antenna, the method including transmitting a first reservation request for a time period for an antenna training of a transmitter/receiver pair, the antenna training being associated with a spatial reuse scheme in a CAP; receiving an approval of the first reservation request; performing the antenna training for the spatial reuse scheme; transmitting a second reservation request for a time period for a data communication of the target transmitter/receiver pair; and receiving an approval of the second reservation request. Here, a time period reserved for the target transmitter/receiver pair may overlap a time period reserved in advance for another transmitter/receiver pair.

The method may further include canceling the approval of the first reservation request and the approval of the second reservation request, when an interference occurring in the other transmitter/receiver pair is equal to or higher than a predetermined level, or when a channel state of the target transmitter/receiver pair is lower than a predetermined level, the interference being caused by receiving the approval of the first reservation request and the approval of the second reservation request.

The method may further include performing the data communication in the time period reserved for the target transmitter/receiver pair.

Effect

According to embodiments of the present invention, communication devices may respectively employ a spatial reuse scheme using directional antennas and thus, it is possible to increase utilization of wireless resources by allocating the same frequency resource and the same time resource to multiple communication links.

Additionally, according to embodiments of the present invention, when a reservation for a time resource is requested from a predetermined transmitter/receiver pair, a time resource reserved in advance for another transmitter/receiver pair may be more efficiently reserved again for the predetermined transmitter/receiver pair by searching for the time resource reserved in advance for the other transmitter/receiver pair. Here, a length of the time resource reserved in advance for the other transmitter/receiver pair may be equal to or greater than a length of the time resource requested from the predetermined transmitter/receiver pair.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
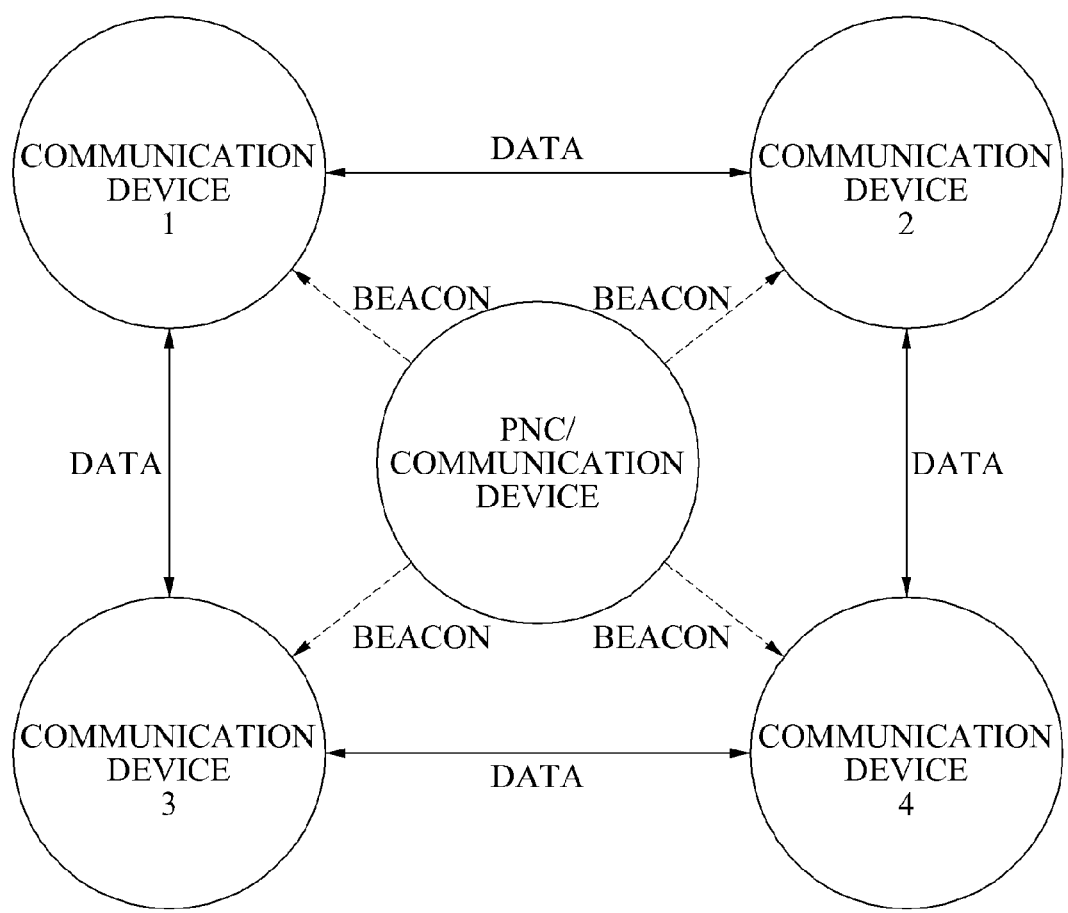
FIG. 1 is a diagram illustrating a pico network (piconet) using a centralized Medium Access Control (MAC) protocol.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a pico network (piconet) using a centralized Medium Access Control (MAC) protocol.

Referring to FIG. 1, the piconet may include a piconet coordinator (PNC), and a plurality of communication devices, namely, communication devices 1 to 4. Here, the communication devices 1 to 4 may include mobile terminals, for example, mobile phones, laptops, smart phones, and the like, and the PNC may be replaced by a communication device. While the piconet will be mainly described in embodiments of the present invention, a technical concept of the present invention may also be applied to a wireless network including a piconet.

The plurality of communication devices 1 to 4 may form transmitter/receiver pairs with a source-destination relationship. Specifically, in the piconet of FIG. 1, a pair of the communication device 1 and the communication device 2, a pair of the communication device 1 and the communication device 3, a pair of the communication device 2 and the communication device 4, and a pair of the communication device 3 and the communication device 4 may be formed as transmitter/receiver pairs.

The transmitter/receiver pairs may receive or transmit beacon messages from or to the PNC, and may acquire time synchronization information and resource allocation information. Additionally, the transmitter/receiver pairs may perform data communication with each other or with the PNC using the acquired time synchronization information and resource allocation information. Here, the PNC may perform time synchronization and resource allocation based on superframes of FIG. 2.

Figure 2:
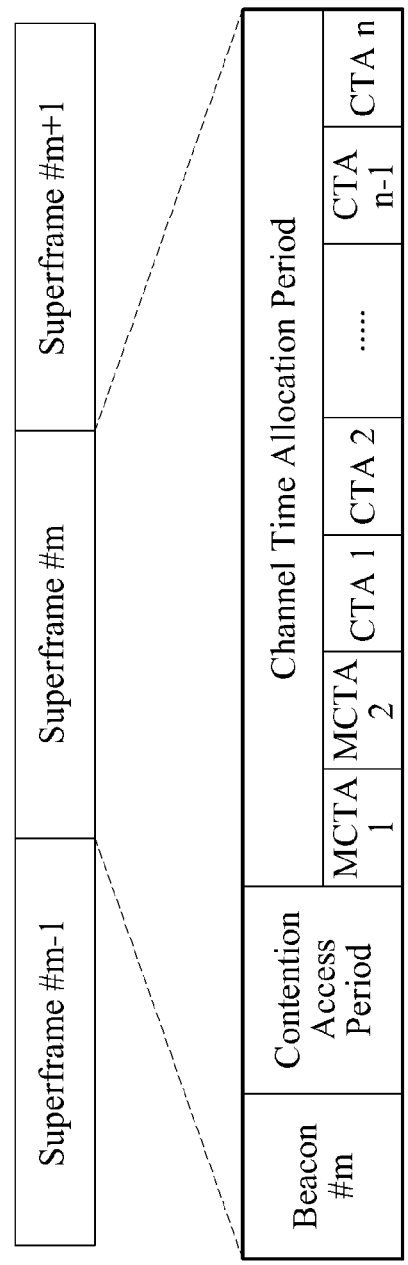
FIG. 2 is a diagram illustrating superframes used in the piconet using the centralized MAC protocol of FIG. 1.

FIG. 2 is a diagram illustrating superframes used in the piconet using the centralized MAC protocol of FIG. 1.

Referring to FIG. 2, an $m^{th}$ superframe includes a Beacon Period (BP) for beacon messages, a Contention Access Period (CAP), and a Channel Time Allocation Period (CTAP).

In the BP, the beacon messages may be exchanged between the PNC and the transmitter/receiver pairs. The beacon messages may include information regarding a length of a superframe, a length of the CAP, a length of the CTAP, time synchronization information, and resource (channel) allocation information.

In the CAP, the transmitter/receiver pairs may perform data communication using a contention access scheme, for example, a Carrier Sensing Multiple Access with Collision Avoidance (CSMA/CA).

In the CTAP, the transmitter/receiver pairs may perform data communication using a contention-free access scheme. The CTAP includes a plurality of Channel Time Allocation (CTA) blocks. The transmitter/receiver pairs may transmit a beacon message to request wireless resources to the PNC in the CAP, and the PNC may transmit a beacon message in response to the beacon message, so that the CTA blocks may be formed.

The CTAP may also include Management Channel Time Allocation (MCTA) blocks, which are used to more effectively perform a part of functions provided in the CAP. The MCTA blocks have no relevance to main operations of the present invention and accordingly, further description thereof will be omitted herein.

The PNC may generate the plurality of CTA blocks contained in the CTAP using a Time Division Multiple Access (TDMA) scheme. Additionally, at least one CTA block for a predetermined transmitter/receiver pair may exist in a single superframe, or may intermittently exist for each superframe.

Typically, communication links within a piconet use different frequency resources or different time resources in order to avoid interferences occurring between the communication links. However, when the transmitter/receiver pairs use a directional antenna to form beams of the communication links in different directions, the interferences between the communication links may be reduced and thus, the communication links may use the same frequency resource and the same time resource. Specifically, the use of the directional antenna may facilitate application of the spatial reuse scheme. Hereinafter, a technology, by which at least two transmitter/receiver pairs reuse wireless resources (in particular, time resources) when the transmitter/receiver pairs apply the spatial reuse scheme will be further described.

Additionally, even when other time resources are available, the same time resource may be allocated to at least two transmitter/receiver pairs that use the spatial reuse scheme to increase the overall network throughput, since the other available time resources may enable a new communication link to be accepted. As a result, in the present invention, time resources for each of the at least two transmitter/receiver pairs may be allocated to overlap each other, regardless of whether time resources remain.

Furthermore, transmitter/receiver pairs that use the directional antenna may perform an antenna training prior to a data communication. The antenna training may enable two communication devices to search for a beam with an optimal direction in order to perform the data communication. Specifically, the two communication devices may form beams of the antenna in various directions based on a predetermined rule, and may search for an optimal beam. In the present invention, with regard to a communication link that requests a new reservation, even when the data communication is performed using the spatial reuse scheme, for example, when the same time resource is allocated to two transmitter/receiver pairs, different time resources may be allocated to perform the antenna training, without using the spatial reuse scheme and thus, it is possible to minimize an interference with a transmitter/receiver pair having a priority. For example, when two transmitter/receiver pairs exist, the two transmitter/receiver pairs may perform the antenna training using different time resources. This operation will be further described below.

Figure 3:
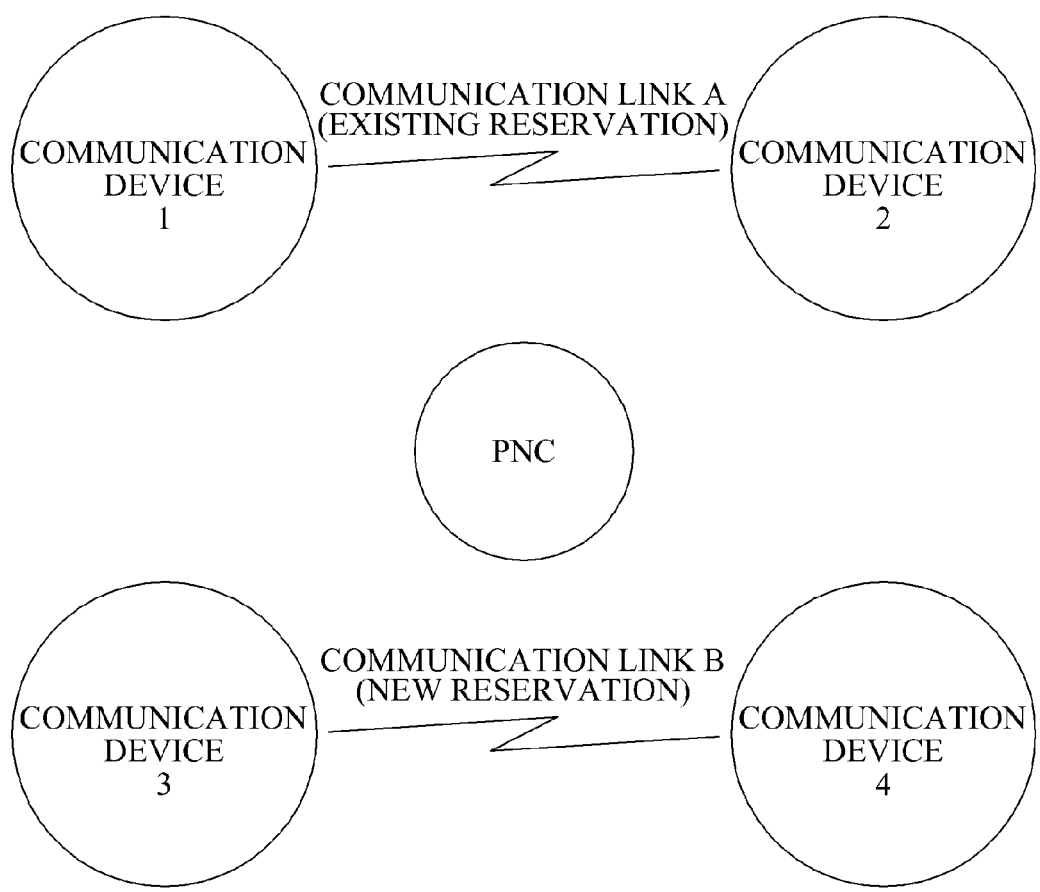
FIG. 3 is a diagram illustrating a piconet where communication links are formed according to an embodiment of the present invention.

FIG. 3 is a diagram illustrating a piconet where two communication links are formed according to an embodiment of the present invention.

As shown in FIG. 3, a communication link A and a communication link B are formed. It is assumed that the communication link A may be formed by a transmitter/receiver pair of a communication device 1 and a communication device 2, and may be reserved in advance by the transmitter/receiver pair. Additionally, it is assumed that a transmitter/receiver pair of a communication device 3 and a communication device 4 desires to form the communication link B through a new reservation.

The two transmitter/receiver pairs may perform the spatial reuse scheme using a directional antenna, even when the same frequency resource and the same time resource are allocated to both of the two communication links, and thus, it is possible to reduce interferences therebetween. Here, a PNC of FIG. 3 may process the new reservation requested from the transmitter/receiver pair of the communication device 3 and the communication device 4.

Figure 4:
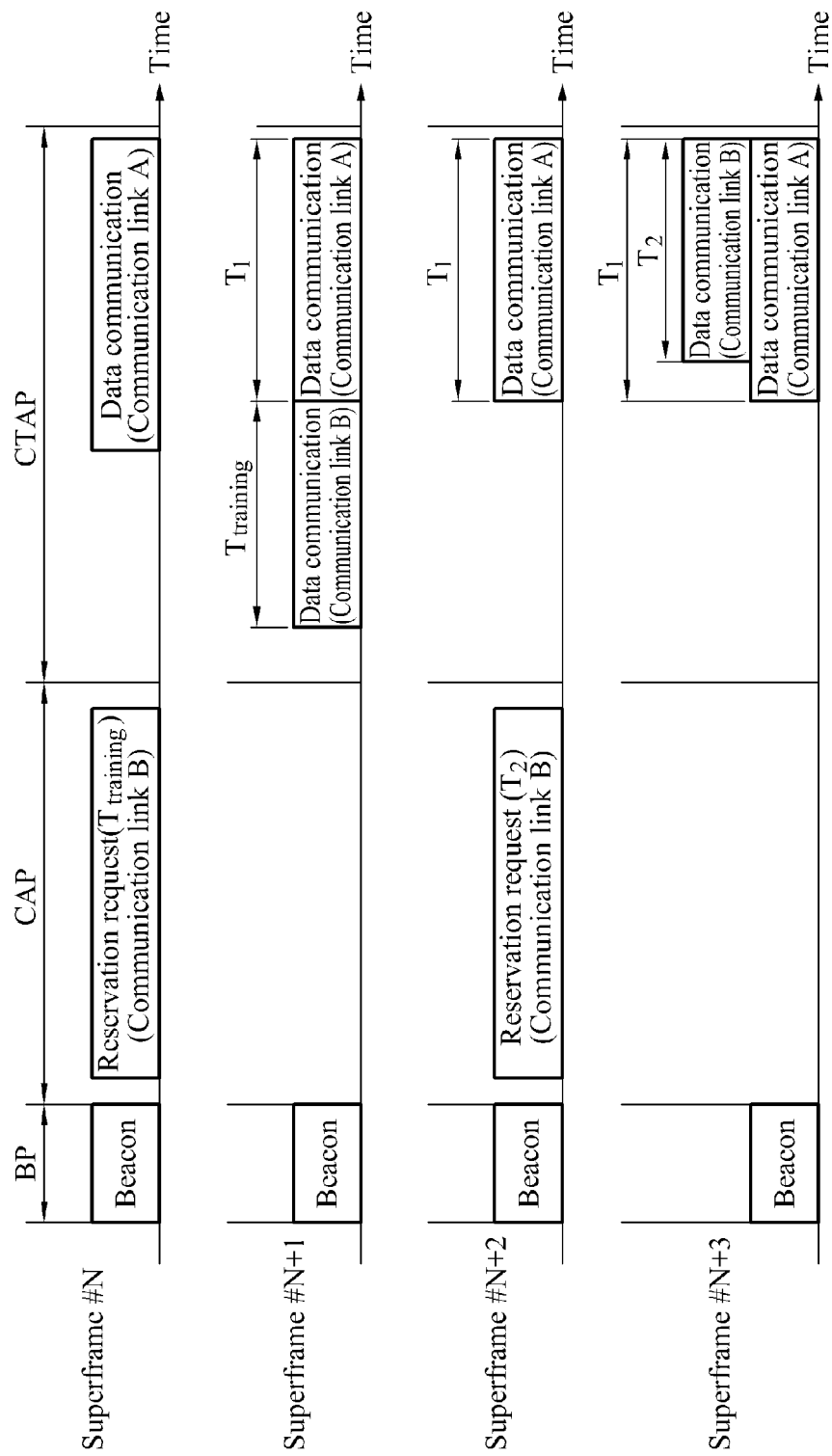
FIG. 4 is a diagram illustrating superframes used in the piconet of FIG. 3.

FIG. 4 is a diagram illustrating superframes used in the piconet of FIG. 3.

Referring to FIG. 4, the transmitter/receiver pair of the communication device 1 and the communication device 2 may use the directional antenna, and may perform data communication through the communication link A in a time period $T_1$ that is reserved in advance in a CTAP of an $N^{th}$ superframe.

For example, when the transmitter/receiver pair of the communication device 3 and the communication device 4 requests a time period $T_2$, the PNC may search for the time period $T_1$ that is reserved in advance in the CTAP of an $N^{th}$ superframe. In this example, the PNC may verify that there is no remaining time resource, and may allocate the time period $T_2$ for the transmitter/receiver pair of the communication device 3 and the communication device 4 using the spatial reuse scheme. Here, the time period $T_2$ may overlap the time period $T_1$. Additionally, even when other time resources are available, the PNC may also allocate the time period $T_2$ overlapping the time period $T_1$ for the transmitter/receiver pair of the communication device 3 and the communication device 4, in order to maximize utilization of time resources.

The operation of processing the new reservation requested from the transmitter/receiver pair of the communication device 3 and the communication device 4 will be further described with reference to FIGS. 5 and 8.

Figure 5:
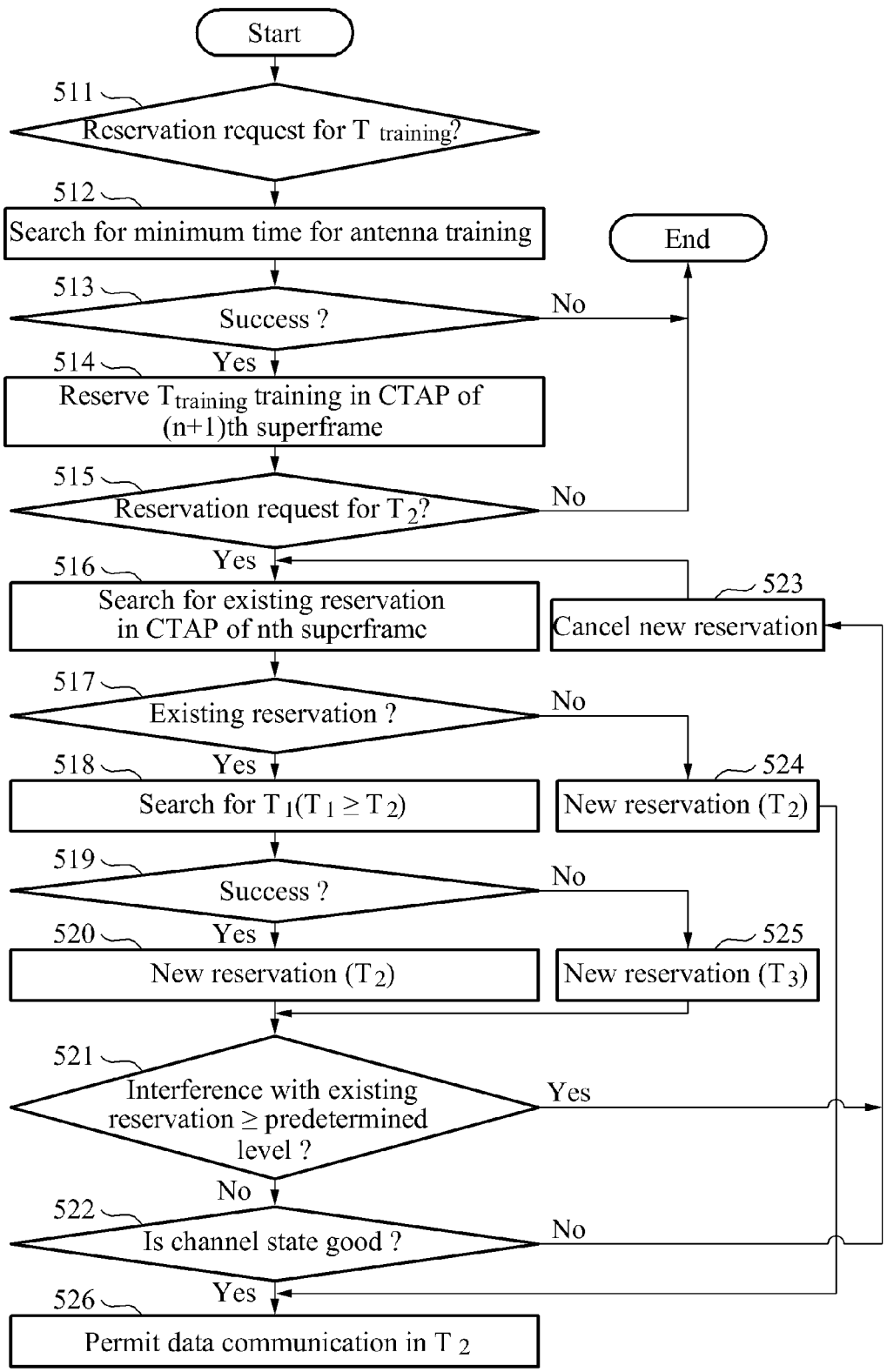
FIG. 5 is a flowchart illustrating a scheme of operating a piconet coordinator (PNC) of FIG. 3, to explain operation of the PNC and the superframes of FIG. 4.

FIG. 5 is a flowchart illustrating a scheme of operating the PNC of FIG. 3, to explain operation of the PNC and the superframes of FIG. 4.

The scheme of operating the PNC will be described with reference to FIGS. 3 and 4.

Referring to FIG. 5, when the spatial reuse scheme is determined to be applied to the transmitter/receiver pair of the communication device 3 and the communication device 4, the PNC may check whether there is a reservation request for a time period $T_{training}$ in the CAP of the $N^{th}$ superframe in operation 511. Here, the time period $T_{training}$ may be a minimum time period used for antenna training.

Subsequently, the PNC may search for the minimum time period required for antenna training, namely, the time period $T_{training}$ in operation 512, and may determine whether the search for the time period $T_{training}$ is successful in operation 513. When the search for the time period $T_{training}$ fails, the operation of the PNC may be terminated until a new operation starts.

Conversely, when the search for the time period $T_{training}$ is successful, the PNC may reserve and allocate the time period $T_{training}$ in a CTAP of an $(N+1)^{th}$ superframe in operation 514, so that the time period $T_{training}$ may not overlap the time period $T_1$ that is reserved in advance for the transmitter/receiver pair of the communication device 1 and the communication device 2. Accordingly, it is possible to avoid interference occurring in the transmitter/receiver pair of the communication device 1 and the communication device 2, while the transmitter/receiver pair of the communication device 3 and the communication device 4 performs antenna training in the CTAP of the $(N+1)^{th}$ superframe.

The transmitter/receiver pair of the communication device 3 and the communication device 4 may perform antenna training using the time period $T_{training}$ reserved and allocated by the PNC in the CTAP of the $(N+1)^{th}$ superframe. When the antenna training is successfully completed, the transmitter/receiver pair of the communication device 3 and the communication device 4 may provide the PNC with information regarding whether the spatial reuse scheme is applicable, and information regarding a time period preferred when the spatial reuse scheme is applicable.

When the antenna training is completed, the transmitter/receiver pair of the communication device 3 and the communication device 4 may send, to the PNC, a request for the time period $T_2$ for data communication in a CAP of an $(N+2)^{th}$ superframe. The PNC may determine whether a reservation request for the time period $T_2$ is received in the $(N+2)^{th}$ superframe from the transmitter/receiver pair of the communication device 3 and the communication device 4 in operation 515.

When the reservation request for the time period $T_2$ is determined to be received from the transmitter/receiver pair of the communication device 3 and the communication device 4, the PNC may search for the time period $T_1$ that is reserved in advance for the transmitter/receiver pair of the communication device 1 and the communication device 2 in operation 516.

Additionally, the PNC may determine whether there are existing reservations for the transmitter/receiver pair of the communication device 1 and the communication device 2, that is, whether the time period $T_1$ reserved in advance for the transmitter/receiver pair of the communication device 1 and the communication device 2 exists in operation 517. When the existing reservations are determined to exist, the PNC may search for the time period $T_1$ reserved in advance for the transmitter/receiver pair of the communication device 1 and the communication device 2 in operation 518. Here, a length of the time period $T_1$ may be equal to or greater than a length of the time period $T_2$. According to an embodiment of the present invention, the PNC may search for the time period $T_1$ having a length less than the length of the time period $T_2$.

The PNC may determine whether the search for the time period $T_1$ is successful in operation 519. When the search for the time period $T_1$ is successful, the PNC may newly reserve and allocate the time period $T_2$ for the transmitter/receiver pair of the communication device 3 and the communication device 4 in an $(N+3)^{th}$ superframe in operation 520. Here, the time periods $T_1$ and $T_2$ may be allocated to overlap each other in the $(N+3)^{th}$ superframe and thus, it is possible to increase utilization of time resources. Additionally, as described above, since the two transmitter/receiver pairs may perform data communication using the spatial reuse scheme, it is possible to prevent interferences from occurring therebetween. Furthermore, in operation 520, the PNC may generate an indicator to indicate that the spatial reuse scheme is used, and may provide the two transmitter/receiver pairs with the generated indicator. The indicator may induce the transmitter/receiver pair of the communication device 3 and the communication device 4 to monitor a channel state.

When the transmitter/receiver pair of the communication device 3 and the communication device 4 performs data communication in the time period $T_2$, the PNC may determine whether an interference occurring in the transmitter/receiver pair of the communication device 1 and the communication device 2 is equal to or higher than a predetermined level in operation 521. When the interference is determined to be equal to or higher than the predetermined level, the new reservation for the transmitter/receiver pair of the communication device 3 and the communication device 4 may be cancelled in operation 523.

Additionally, the transmitter/receiver pair of the communication device 3 and the communication device 4 may check a channel state between the communication device 3 and the communication device 4 for a predetermined time corresponding to the new time period $T_2$ in operation 522. When the channel state is determined to be bad, the new reservation may be cancelled in operation 523. Here, the transmitter/receiver pair of the communication device 3 and the communication device 4 may further monitor a Clear Channel Assessment (CCA).

When the interference occurring in the transmitter/receiver pair of the communication device 1 and the communication device 2 is lower than the predetermined level, when the CCA is positive, and when the channel state between the communication device 3 and the communication device 4 is determined to be suitable, the PNC may permit the data communication of the transmitter/receiver pair of the communication device 3 and the communication device 4 in operation 526.

Otherwise, when there is no existing reservation in operation 517, or when the time period $T_1$ is not found as a result of the searching in operation 519, the PNC may reserve a new time period $T_2$ in operations 524 and 525.

The PNC may include directional antennas, similar to other communication devices having directional antennas. Additionally, the PNC may divide each area corresponding to each directional antenna into at least two sectors, and may manage the at least two sectors. Hereinafter, an example where a plurality of sectors exist will be described with reference to FIGS. 6 and 7.

Figure 6:
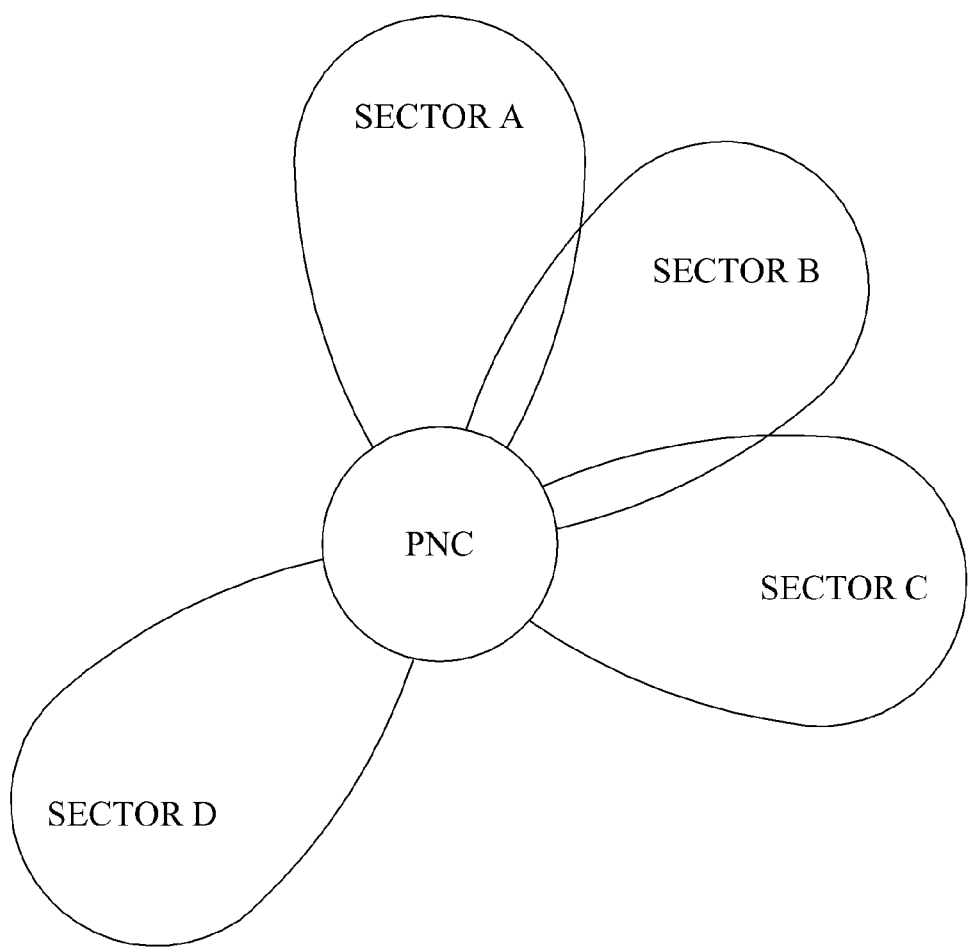
FIG. 6 is a diagram illustrating a piconet including multiple sectors.

FIG. 6 is a diagram illustrating a piconet including multiple sectors.

Referring to FIG. 6, a PNC including directional antennas may manage several areas based on directions of beams that are able to be formed. In this example, a PNC may manage sectors A, B, C, and D. Additionally, the PNC may determine whether to use the spatial reuse scheme, and whether to allocate time periods for transmitter/receiver pairs so that the allocated time periods may overlap each other, based on a sector that contains the transmitter/receiver pairs. For example, when a sector including the transmitter/receiver pair of the communication device 1 and the communication device 2 is identical to a sector including the transmitter/receiver pair of the communication device 3 and the communication device 4, or when the two sectors are located close to each other, the PNC may allocate different time resources for the transmitter/receiver pairs, not using the spatial reuse scheme.

Figure 7:
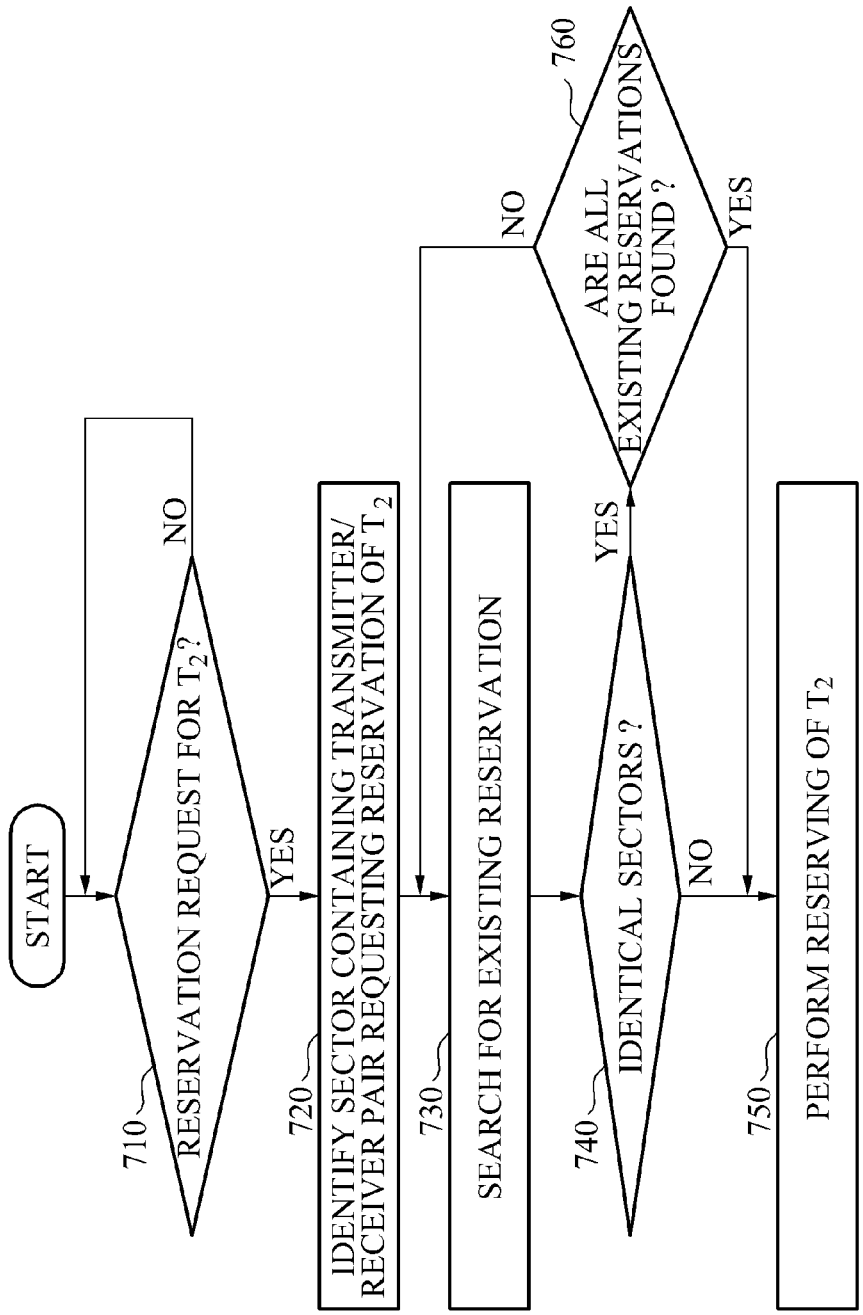
FIG. 7 is a flowchart illustrating a scheme of operating a PNC when a piconet includes a plurality of sectors, according to an embodiment of the present invention.

FIG. 7 is a flowchart illustrating a scheme of operating a PNC when a piconet includes a plurality of sectors, according to an embodiment of the present invention.

Referring to FIG. 7, the PNC may determine whether a reservation request for the time period $T_2$ is received from a transmitter/receiver pair that is to perform data communication using the spatial reuse scheme in operation 710.

When the reservation request for the time period $T_2$ is determined to be received, the PNC may identify a sector containing the transmitter/receiver pair that requests a reservation of the time period $T_2$, among the plurality of sectors in operation 720.

Additionally, to identify a sector including a transmitter/receiver pair with an existing reservation, the PNC may search for the existing reservation in operation 730. The PNC may determine whether the sector including the transmitter/receiver pair with the existing reservation is identical to a sector including the transmitter/receiver pair that requests the reservation of the time period $T_2$ in operation 740.

When the two sectors are determined to be different from each other, the PNC may perform the reserving of the time period $T_2$ as shown in FIG. 6, in operation 750. Conversely, when the two sectors are determined to be identical to each other, the PNC may search for other existing reservations in operation 760, and may repeat operations 730 and 740 with respect to the existing reservations found as a result of the searching.

For example, it is assumed that time periods $T_1$, $T_3$ and $T_4$ are respectively reserved in advance by transmitter/receiver pairs X, Y, and Z. In this example, when a transmitter/receiver pair A requests a reservation of the time period $T_2$, the time period $T_2$ for the transmitter/receiver pair A may be allocated so as to overlap at least one of the time periods $T_1$, $T_3$ and $T_4$. When the transmitter/receiver pair A is contained in a same sector as the transmitter/receiver pairs X and Y, but in a different sector from the transmitter/receiver pair Z, the time period $T_2$ for the transmitter/receiver pair A may be allocated so as to overlap the time period $T_4$ for the transmitter/receiver pair Z. Alternatively, when the transmitter/receiver pair A is contained in a same sector as the transmitter/receiver pairs X and Z, but in a different sector from the transmitter/receiver pair Y, the time period $T_2$ for the transmitter/receiver pair A may be allocated so as to overlap the time period $T_3$ for the transmitter/receiver pair Y.

Figure 8:
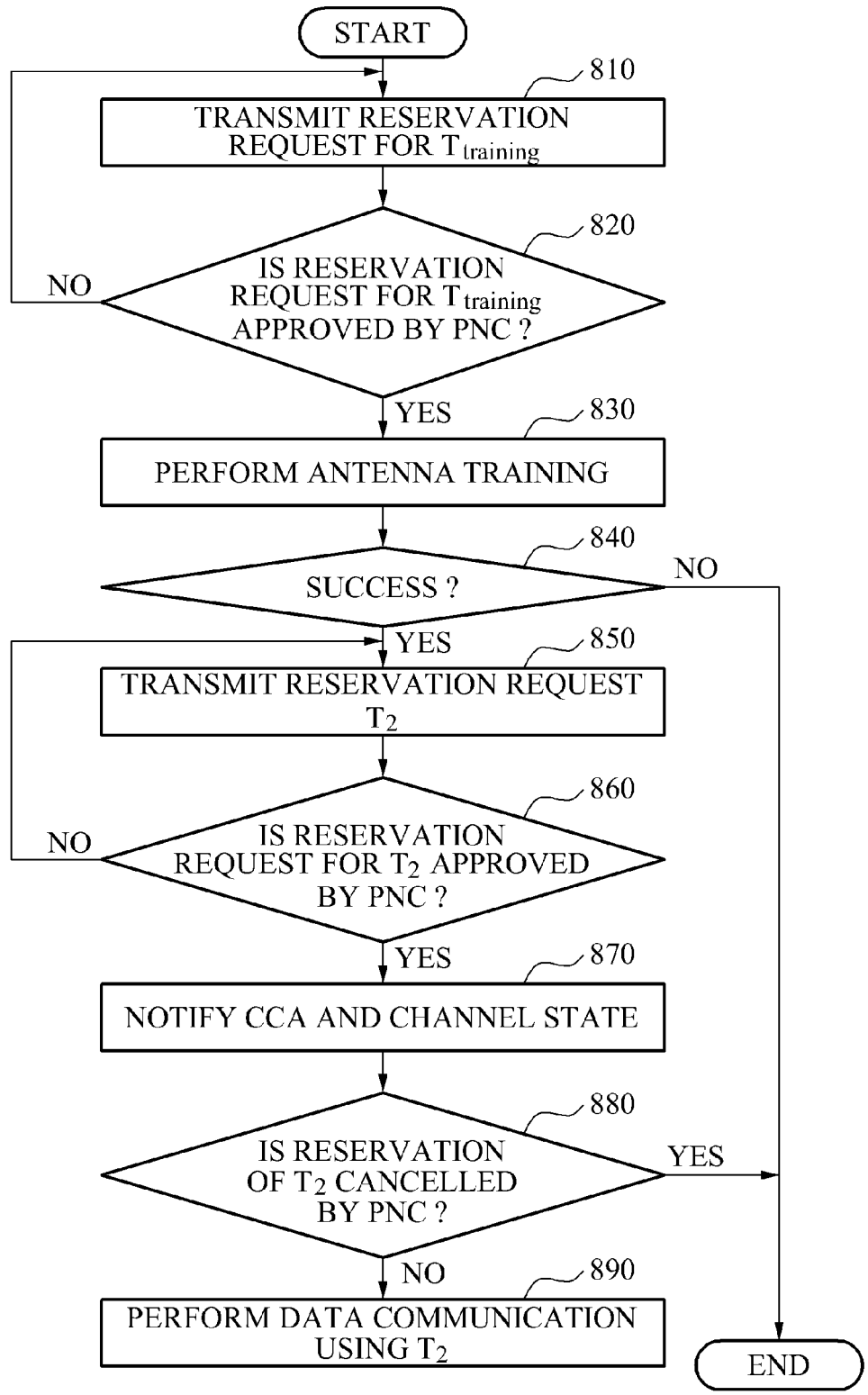
FIG. 8 is a flowchart illustrating a scheme of operating a communication device 3 or a communication device 4 of FIG. 3.

FIG. 8 is a flowchart illustrating a scheme of operating the communication device 3 or the communication device 4 of FIG. 3.

Referring to FIG. 8, when the spatial reuse scheme is determined to be applied to the transmitter/receiver pair of the communication device 3 and the communication device 4, the transmitter/receiver pair of the communication device 3 and the communication device 4 may transmit, to the PNC, a reservation request for the time period $T_{training}$ for antenna training in the CAP of the $N^{th}$ superframe in operation 810.

Specifically, the PNC may search for the time period $T_{training}$ that is a minimum time period required for the antenna training, and may reserve and allocate the time period $T_{training}$ in the CTAP of the $(N+1)^{th}$ superframe, so that the time period $T_{training}$ may not overlap the time period $T_1$ reserved in advance for the transmitter/receiver pair of the communication device 1 and the communication device 2.

The transmitter/receiver pair of the communication device 3 and the communication device 4 may determine whether the reservation request for the time period $T_{training}$ is approved by the PNC in operation 820. When the reservation request for the time period $T_{training}$ is approved by the PNC, the transmitter/receiver pair of the communication device 3 and the communication device 4 may perform the antenna training using the time period $T_{training}$ reserved and allocated in the CTAP of the $(N+1)^{th}$ superframe in operation 830.

Additionally, the transmitter/receiver pair of the communication device 3 and the communication device 4 may determine whether the antenna training is successfully performed in operation 840. When the antenna training is determined to be successfully performed, the transmitter/receiver pair of the communication device 3 and the communication device 4 may transmit, to the PNC, a reservation request for the time period $T_2$ for data communication in the CAP of the $(N+2)^{th}$ superframe in operation 850.

In response to the reservation request for the time period $T_2$, the PNC may search for the time period $T_1$ reserved in advance for the transmitter/receiver pair of the communication device 1 and the communication device 2, and may newly reserve and allocate the time period $T_2$ for the transmitter/receiver pair of the communication device 3 and the communication device 4 in the $(N+3)^{th}$ superframe, so that the time periods $T_1$ and $T_2$ may overlap. Here, the length of the time period $T_1$ may be equal to or greater than the length of the time period $T_2$.

In addition, the transmitter/receiver pair of the communication device 3 and the communication device 4 may determine whether the reservation request for the time period $T_2$ is approved by the PNC in operation 860. When the reservation request for the time period $T_2$ is approved by the PNC, the transmitter/receiver pair of the communication device 3 and the communication device 4 may notify the PNC of a result of checking the CCA and the channel state in operation 870. Accordingly, the PNC may cancel the reservation of the time period $T_2$ based on the result of checking the CCA and the channel state.

When the reservation of the time period $T_2$ is not cancelled, the transmitter/receiver pair of the communication device 3 and the communication device 4 may perform data communication using the time period $T_2$ in operation 890.

The methods according to the above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of allocating a time period for a communication device, the method comprising:
   receiving a request for allocation of a second time period related to a second communication link, after allocation of a first time period related to a first communication link; and
   reserving the second time period overlapped with the first time period at same time resources;
   wherein the first communication link is generated between a first communication device and a second communication device, and the second communication link is generated between a third communication device and a fourth communication device; and
   wherein the second time period is canceled for stopping a spatial reuse when a link state of the second communication link is lower than a predetermined level,
   wherein the second time period is allocated after an antenna training of the second communication link, and
   wherein an antenna training for the first time period and the antenna training of the second communication link is performed using a directional antenna for beamforming at different time resources.

2. The method of claim 1, further comprising:
   permitting a data communication for the second communication link based on a channel state of the first communication link.

3. The method of claim 2, wherein the data communication for the second communication link is permitted whether interference for the first communication link is lower than a predetermined level.

4. The method of claim 2, wherein the data communication for the second communication link is permitted when the channel state of the first communication link is good.

5. The method of claim 1, wherein a length of the first time period reserved in advance is equal to or greater than a length of the second time period.

6. The method of claim 1, wherein the second time period is allocated, after an antenna training of the second communication link, the antenna training being associated with the spatial reuse scheme.

7. A method of allocating a time period for a communication device, the method comprising:
   identifying a first time period related to a first communication link reserved in advance;
   receiving a request for allocating a second time period related to a second communication link different from the first communication link; and
   allocating the second time period to be overlapped spatially with the first time period at same time resources;
   wherein the second time period is canceled for stopping a spatial reuse when a link state of the second communication link is lower than a predetermined level,
   wherein the second time period is allocated after an antenna training of the second communication link, and
   wherein an antenna training for the first time period and the antenna training of the second communication link is performed using a directional antenna for beamforming at different time resources.

8. The method of claim 7, wherein the first communication link is generated between a first communication device and a second communication device, and the second communication link is generated between a third communication device and a fourth communication device.

9. The method of claim 7, further comprising:
   permitting a data communication for the second communication link based on a channel state of the first communication link.

10. The method of claim 9, wherein the data communication for the second communication link is permitted whether interference for the first communication link is lower than a predetermined level.

11. The method of claim 9, wherein the data communication for the second communication link is permitted when the channel state of the first communication link is good.

12. The method of claim 7, wherein a length of the first time period reserved in advance is equal to or greater than a length of the second time period.

13. The method of claim 7, wherein the second time period is allocated, after an antenna training of the second communication link, the antenna training being associated with the spatial reuse scheme.

14. A method of allocating a time period for a communication device, the method comprising:
   identifying an existing reservation for a first time period of a first communication link between a first communication device and a second communication device;
   receiving a new reservation for a second time period of a second communication link between a third communication device and a fourth communication device; and
   allocating the second time period to be overlapped spatially with the first time period at same time resources;
   wherein the second time period is canceled for stopping a spatial reuse when a link state of the second communication link is lower than a predetermined level,
   wherein the second time period is allocated after an antenna training of the second communication link, and
   wherein an antenna training for the first time period and the antenna training of the second communication link is performed using a directional antenna for beamforming at different time resources.

15. The method of claim 14, further comprising:
   permitting a data communication for the second communication link based on a channel state of the first communication link.

16. The method of claim 15, wherein the data communication for the second communication link is permitted whether interference for the first communication link is lower than a predetermined level.

17. The method of claim 15, wherein the data communication for the second communication link is permitted when the channel state of the first communication link is good.

18. The method of claim 14, wherein a length of the first time period reserved in advance is equal to or greater than a length of the second time period.

19. The method of claim 14, wherein the second time period is allocated, after an antenna training of the second communication link, the antenna training being associated with the spatial reuse scheme.

* * * * *